May 1, 1945.   M. R. SASLAW   2,374,706
HEATED TOOL PERFORATING
Filed July 22, 1944   2 Sheets-Sheet 1

INVENTOR
Max R. Saslaw
BY
Roscoe Millwood
ATTORNEY

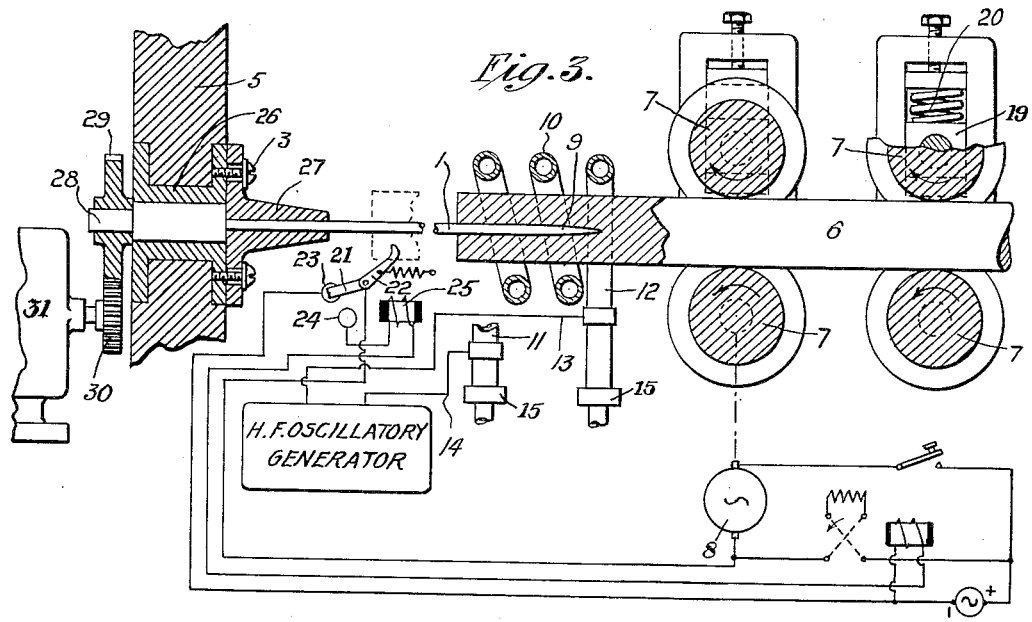
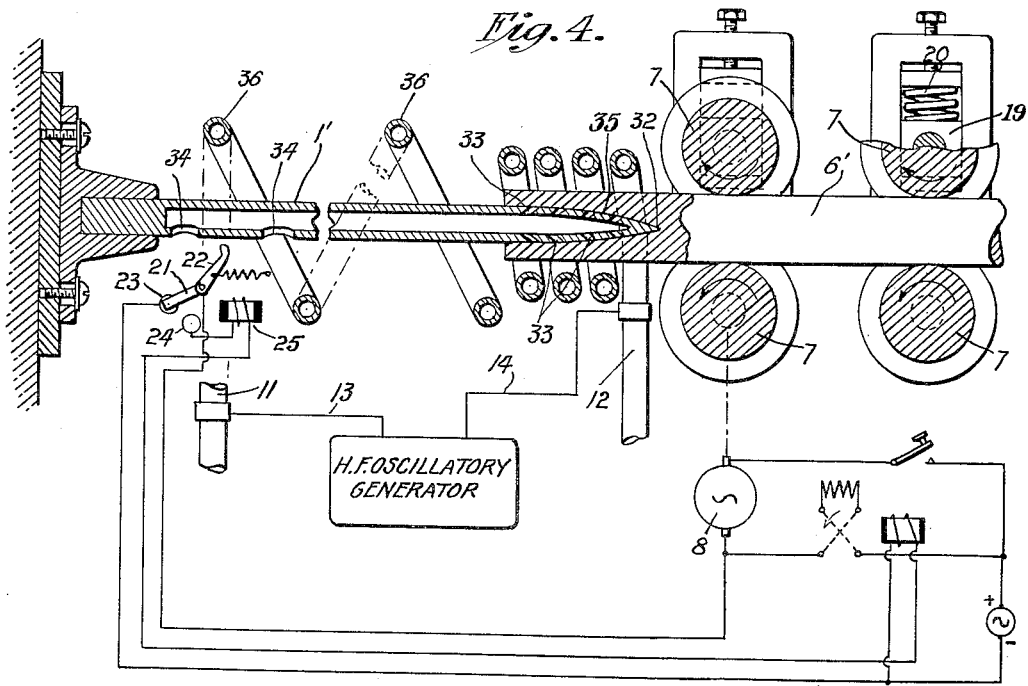

Patented May 1, 1945

2,374,706

UNITED STATES PATENT OFFICE 2,374,706

HEATED TOOL PERFORATING

Max R. Saslaw, East Orange, N. J., assignor to Federal Telephone and Radio Corporation Application July 22, 1944, Serial No. 546,165

13 Claims. (Cl. 164—125)

The present invention relates to the manufacture of articles having perforations formed through the instrumentality of a heated perforating tool or needle and comprises an improved method operating more successfully to perform the perforating operation and to eliminate certain objectionable factors as heretofore experienced in operations of this kind. It further includes an improved apparatus particularly designed for the piercing of a longitudinal hole or bore through an article and particularly holes of small diameter and of substantial length such as in the piercing of a piece of wood for the making of a pencil. In the piercing of articles of this character as heretofore practiced, wherein heated needles or pointed piercing tools are employed, it has been found to be necessary repeatedly to heat the piercing tool for the completion of penetration. There is, moreover, a pronounced tendency to the formation of tapering holes which are excessively enlarged particularly at the entrance end, even under the conditions of the operation being performed by opposed needles and boring of the perforation from each end of the stick or articles.

In accordance with the present invention a heated tool penetration may successively be performed as a continuing and progressive operation and under conditions to insure producing a bore or aperture of uniform diameter throughout the length thereof. This is preferably accomplished by the employment of a rigidly supported penetrating tool or needle and advancing of the article, such as a pencil stick, with relation thereto while subjecting the pointed end portion of the penetrating tool continuously to the influence of a high frequency inductive heating flux whereby the active penetrating portion of the tool is maintained at a constant and effective temperature throughout the operation and wherein the remainder or follower portion of the tool will be relatively cooler thereby to avoid enlargement of the bore and undesired non-parallel relation of the cylindrical wall thereof. In accordance with further features of the invention the penetrating needle or tool, heated in the improved manner referred to, may in addition be rotated throughout the operation with the result that the internal surface of the bore as produced is burnished by the trailing portion of the penetrating tool, thereby further to improve the results of the operation. Further features of the invention, particularly applicable to the penetration of articles formed of certain plastics or other material becoming amorphous on heating, contemplates the use of a hollow penetrating tool having its walls suitably orificed and with a concentration of the heating field at the extremity or penetrating point and with a reduced heating effect extended over the trailing portion of the tool so as to promote a fluid discharge of the displaced material in the formation of the bore.

The described and other features and advantages of the present improvements will be more fully understood by reference to the accompanying drawings wherein like reference characters are applied to corresponding parts in the several views.

In the drawings:

Fig. 3 is a longitudinal sectional and elevational view corresponding to Fig. 2 and showing a desirable modification wherein the piercing tool is rotated.

Fig. 4 is a similar view of a further modification employing a tubular needle adapted for penetration with the concentration and maintenance of heat at the entry portion and particularly adapted for perforation of material which becomes fluid under the heating action.

Figure 1:
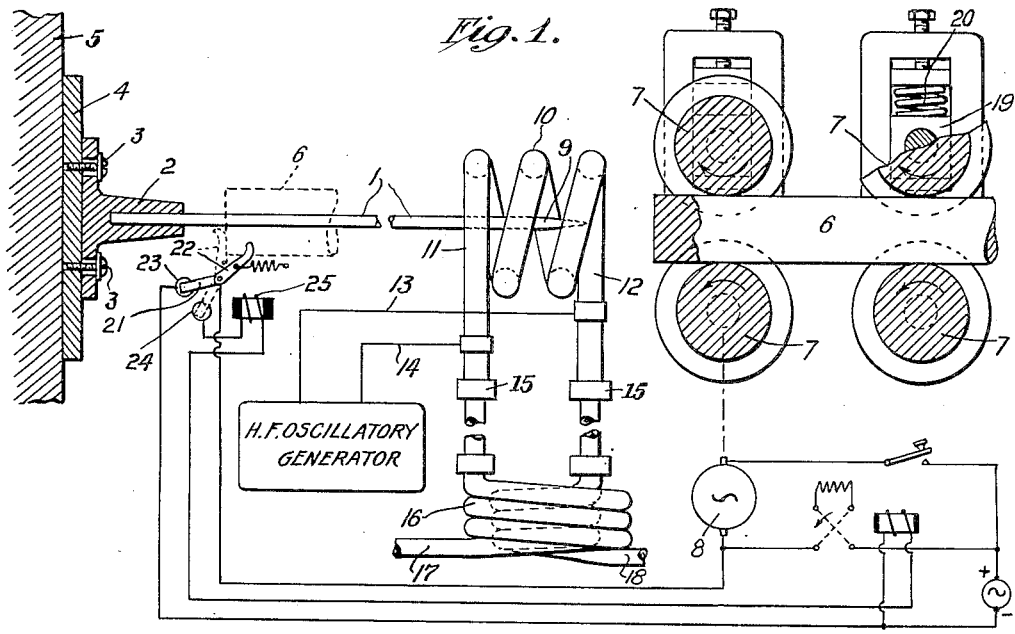
Fig. 1 is a diagrammatic view showing a desirable embodiment of the features of the invention in an arrangement adapted for the longitudinal perforation of wood pencil sticks or body portions.
Figure 2:
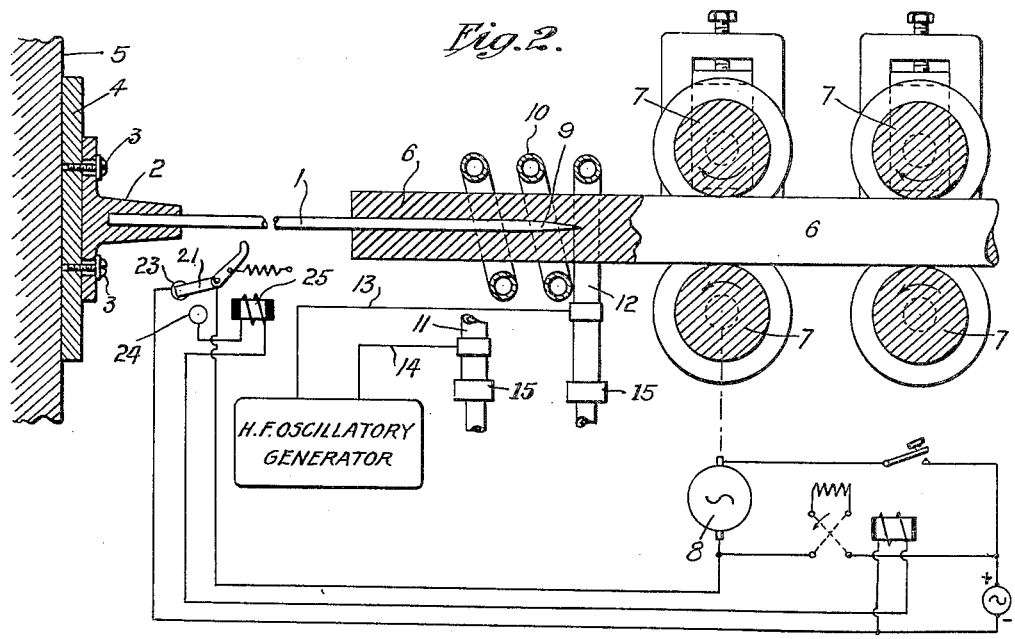
Fig. 2 is a similar view showing the pencil body advanced upon the penetrating tool and with portions shown in section better to illustrate the operation.

In the preferred embodiment of the invention, as illustrated in Figs. 1 and 2, the penetrating tool 1 is shown rigidly supported in a bracket 2 adjustably secured by screws 3 to bearing plate 4 secured on a suitable support 5. The penetrating tool or needle is in the form of a rod which may be of circular cross section and of uniform diameter for the major portion of its length with the exception of its extreme forward portion which is tapered to a point as illustrated. The pencil body 6 to be perforated is supported in axial alignment with the tool 1 by means of suitably journalled rollers 7 of a form closely to embrace a pencil body 6 whether of the customary rounded, hexagonal or other cross-sectional form. The lower rollers 7 are desirably supported in fixed bearings while the upper rollers are supported in spring housings so that the upper rollers exert a downward spring pressure on the pencil body. Provision is made for advancing the pencil body by driving of the lower rollers which may be effected by suitable reversing motor 8 connected to one or more of the lower rollers with provision for advancing the pencil with a uniform, progressive motion until completion of its piercing operation and with a reversal of the motion for retracting the finished product.

In accordance with the invention the heating of the penetrating tube is effected in a manner to concentrate the heating thereof at its extreme forward or pointed end portion 9 and continually throughout the operation to maintain the heat of its active pointed portion by means of high frequency induction heating. This is effected as shown by surrounding the forward end portion of the penetrating tool with an inductor coil 10, the terminal portions 11, 12 of which are connected by leads 13, 14 to the output terminals of a high frequency oscillatory generator which may desirably operate at a frequency of 500 kilocycles to 20 megacycles. The inductor 10, in the instance as shown, is formed as a three turn coil of copper tubing having a coil diameter permitting spaced reception of the pencil body therein; the coil maintaining a fixed relation to the stationary penetrating tool and having its terminals connected by couplings 15 to the customarily employed porcelain cooling coil 16 having intake 17 and outlet 18, through which water is circulated for cooling.

As shown in Fig. 1 the circuit connections of the reversing driving motor M include suitable switching means for closing of the circuit for advancing of the pencil sticks or bodies after they are placed in position between the rolls, the insertion of the sticks being accommodated by the upward yielding of the upper roll bearing blocks 19 against the influence of the springs 20 of their spring housing supports. The switch provided therefor may be any suitable reversing switch 21 having an arm 22 positioned in the path of movement of the pencil stick to be engaged by the forward end thereof at the extremity of the operational feed movement after completion of the penetrating operation. This engagement operates to shift the arm 21 from normally engaged contact 23 to contact 24 having in circuit therewith slow to release relay 25 to cause the reverse feed until the stick is fully retracted. A manually operated switch is provided for restarting the feed movement. The high frequency energizing circuit for the inductor 10 as will be understood may desirably be in continuous operation thereby to be effective for continually heating the forward portion or penetrating point of the tool 1 as the pencil body is progressed thereover; the degree of heat generated in this penetrating portion being sufficient to burn the hole in the wood throughout the length thereof while the follower or trailing portion of the tool remains relatively cooler so as to avoid enlargement of the bore as will be readily appreciated.

While a desirable embodiment of the invention is shown in the disclosure of Figs. 1 and 2 it will be understood that various modifications thereof and additional features of advantage may be incorporated therewith without departing from the scope of the invention. As illustrative thereof there is diagrammatically shown in Fig. 3 a modification wherein further provision is made for imparting a rotary motion to the penetrating tool during the operation which consists in suitably journalling the tool at its supported end within bearing members 26, 27 secured on the support 5 and wherein the rearwardly extended portion 28 of the tool has a pinion 29 affixed thereon and driven by a drive pinion 30 of a motor 31. In this arrangement the pointed end portion of the tool 1 is similarly heated by the inductor coil 10 with the trailing portion as before being unheated and relatively cooler and by reason of its rotation operating to burnish the cylindrical wall surfaces of the bore so as to improve the surface thereof.

A further modification of the improved arrangement for a concentration of induction heating at the penetrating portion the tool is shown in Fig. 4 in an arrangement particularly adapted for the piercing and forming of bores within materials such as plastics of the synthetic resinous type having the characteristics of flowing at the temperature to which they are subjected in the piercing operation. In connection therewith a hollow bodied penetrating tool 1' is employed having a penetrating forward point 32 with the tapered portion immediately rearward of the point being formed with small openings or orifices 33 communicating with the hollow interior of the tool which at its rearward portion is provided with additional openings 34 through its sidewall for the discharge of fluid material. In this modification while the inductor is as shown formed for concentration of the penetrating heat at the forward piercing portion 35 of the tool, it is likewise formed with a rearward widely spaced coil extension 36 operating inductively to heat the trailing body portion of the tool sufficient to insure flow of the displaced material therefrom.

While approved embodiments of the features of the invention are shown, it will be understood that varied modifications may be made therein without departing from the invention as defined in the claims. As illustrative, while there is shown a single penetrating tool associated with the heating coil, it will be understood that multiple pointed tools may be similarly heated by a single coil if desired.

Having described my invention, I claim:

1. The herein described method of piercing articles by means of a heated penetrating tool which consists in advancing the position of the article relative to the tool while continuously heating the tool by high frequency induction heating during the penetrating operation.

2. The herein described method of piercing articles by means of a heated penetrating tool which consists in advancing the position of the article relative to the tool with a continuous and concentrated heating of the entry end portion of the tool by high frequency induction heating during the penetrating operation.

3. The herein described method of piercing articles by means of a heated penetrating tool which consists in advancing the position of the article relative to the tool with a continuous heating of the entry end portion only of the tool by high frequency induction heating during the penetrating operation.

4. Apparatus for the piercing of articles by means of a heated piercing tool comprising a piercing tool suitably supported, means for advancing the position of an article to be pierced relative to the tool and means for heating the entry end portion of the tool by high frequency induction heating during the piercing operation.

5. Apparatus for piercing of articles by means of a heated piercing tool comprising a piercing tool suitably supported, means for advancing the position of an article to be pierced relative to the tool and means for heating the entry end portion only of the tool by high frequency induction heating consisting of an inductor magnetically coupled to the entry end of the tool and a high frequency energizing source connected thereto.

6. Apparatus for the piercing of articles by means of a heated piercing tool comprising a piercing tool suitably supported against axial movement, means for advancing an article axially with relation to the tool and means for continuously heating the entry end portion of the tool during the piercing operation comprising an inductor coil surrounding the end portion of the tool and having a diameter to freely enclose the article and a high frequency energizing source for the inductor.

7. Apparatus for the piercing of articles by means of a heated piercing tool comprising a pointed piercing tool supported against axial movement, feed rollers journalled in position for advancing an article with relation to the tool and axially thereof and means for heating the entry end portion of the tool consisting of an inductor coil surrounding the piercing end portion of the tool only and having a diameter to permit advance of the article over the tool and a high frequency energizing source connected to the inductor.

8. Apparatus for the piercing of articles by means of a heated piercing tool comprising a piercing tool supported against axial movement, means for advancing the position of an article to be pierced relative to the tool, means for continuously and highly heating the entry end portion only of the tool by high frequency induction heating throughout the piercing operation and said article advancing means being operative automatically to retract the article at the completion of the piercing operation.

9. Apparatus for the piercing of articles by means of a heated piercing tool comprising a piercing tool suitably supported, means for rotating the tool, means for advancing the position of an article to be pierced relative to the tool and means for continuously heating the entry end portion of the tool by high frequency induction heating during the piercing operation.

10. Apparatus for the piercing of articles by means of a heated piercing tool comprising a piercing tool having a tapered entry end portion suitably supported against axial movement, means for rotating the tool, means for advancing an article to be pierced relative to the tool and means for continuously heating the entry end portion only of the tool by high frequency induction heating during the piercing operation.

11. Apparatus for the piercing of articles by means of a heated piercing tool comprising a piercing tool having a pointed entry end portion and suitably supported against axial movement, heated rollers positioned for advancing an article to be pierced relative to the tool and axially thereof, means for continuously heating the entry end portion only of the tool by high frequency induction heating during the piercing operation, a reversing motor for driving the feed rollers and a control switch connected to effect reversal of the motor and positioned to be engaged by the article at the extremity of its advance movement.

12. Apparatus for the piercing of articles by means of a heated piercing tool comprising a hollow bodied piercing tool having a tapered entry end portion, said entry portion being provided with orifices communicating with the interior of the tool, and said tool being provided with discharge openings removed from the entry portion, means for advancing the position of an article to be pierced relative to the tool and means for continuously heating the entry end portion of the tool by high frequency induction heating during the piercing operation and for heating the body of the tool to a lesser degree for the fluid discharge of displaced material.

13. Apparatus for the piercing of articles by means of a heated piercing tool comprising a hollow bodied piercing tool supported against axial movement, means for advancing an article to be pierced relative to the tool, said tool being formed at its entry portion with orifices communicating with the interior thereof and having discharge openings removed from the entry portion and communicating with the interior of the tool and means for continuously heating the tool by high frequency induction heating during the piercing operation consisting of an inductor coil formed for heat concentration at the entry end portion of the tool and for reduced heating of the follower body portion of the tool and a high frequency energizing source connected to the inductor.

M. R. SASLAW.